Aug. 12, 1924.

E. A. McKOY ET AL 1,504,963

STUMP CUTTER

Filed May 23, 1921

INVENTORS
EDWIN A. McKOY,
GEORGE D. MOORE,
BY

ATTORNEY.

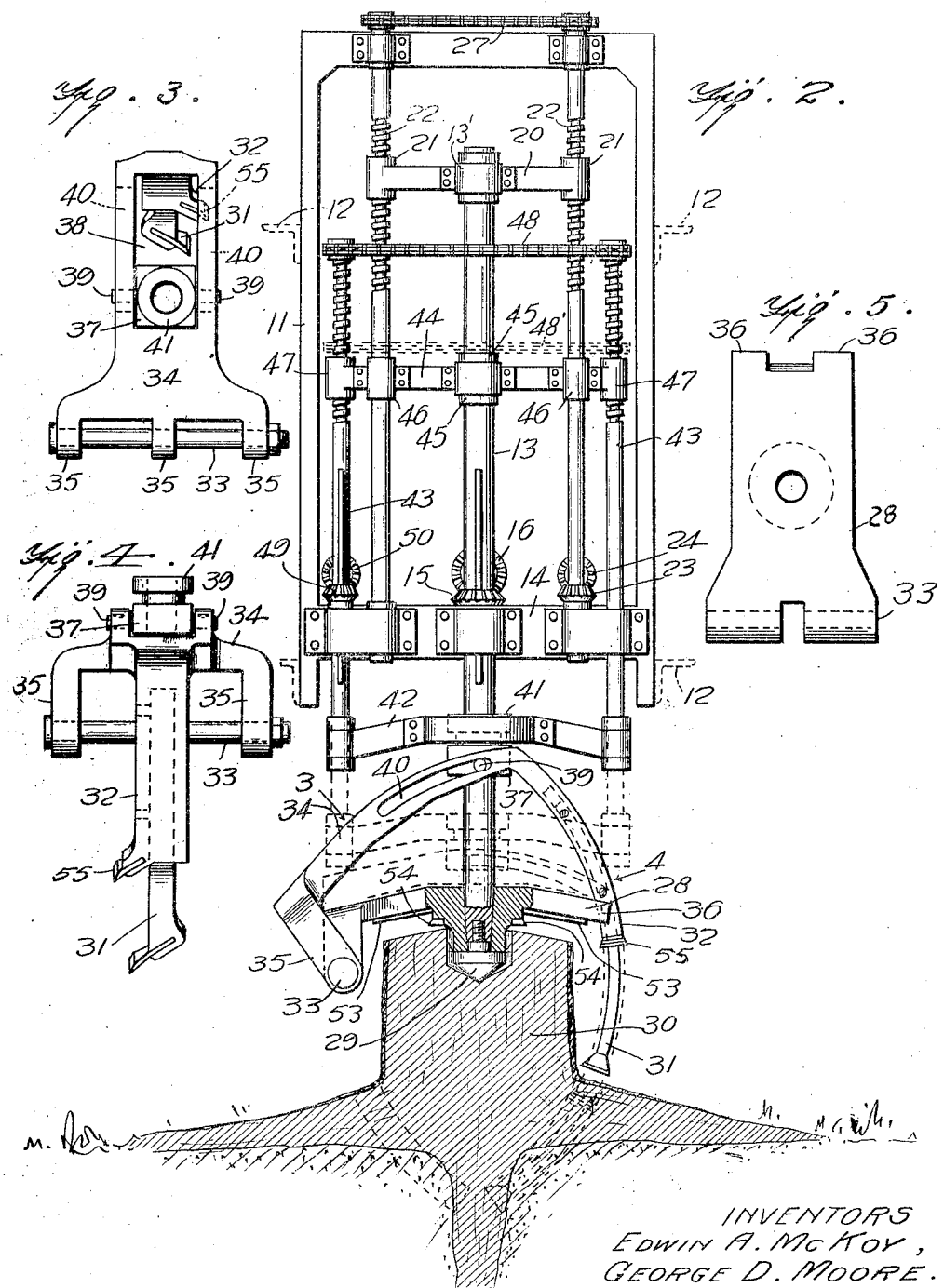

Patented Aug. 12, 1924.

1,504,963

UNITED STATES PATENT OFFICE.

EDWIN A. McKOY AND GEORGE D. MOORE, OF NEW ORLEANS, LOUISIANA.

STUMP CUTTER.

Application filed May 23, 1921. Serial No. 471,624.

*To all whom it may concern:*

Be it known that we, EDWIN A. McKOY and GEORGE D. MOORE, citizens of the United States, residing at New Orleans, in the parish of Orleans and State of Louisiana, have invented certain new and useful Improvements in Stump Cutters, of which the following is a specification.

This invention relates to stump cutters, and has for an object to provide an improved device for severing the body of a standing stump from its supporting roots, whereby the stump body may be removed, as an entirety, for further processing.

A further object of the invention is to provide a mechanism comprising a rotating cross head, having a cutter arm carrying a cutter, positioned when advanced, to produce a conoidal cut, and having improved means for advancing the cutter end of the cutter arm, independently of the cross head.

A further object of the invention is to provide a device, adapted to be operated from a dirigible, or portable, power plant, embodying a cross head, with improved means for raising and lowering it respectively into and out of operative engagement with the stump, and means for advancing a knife arm, carried by and rotating with, the cross head for producing a conoidal cut, with the apex extending downwardly, preferably below the surface of the ground.

With these and other objects in view the invention comprises certain novel units, parts, elements, combinations and arrangements of parts, as will be hereinafter more fully described and claimed.

In the drawings:

Figure 2 is a view of the cutting mechanism seen in front elevation, the power plant not being shown.

Figure 3 is a view of the cutter-arm and controlling member seen substantially along the arrow 3 of Figure 2.

Figure 4 is a view of the cutter arm and its controlling part seen substantially along arrow 4 of Figure 2.

Figure 5 is a top plan view of the cross head, with the knife arm and actuating parts removed and disconnected from the spindle.

Like characters of reference designate corresponding parts throughout the several views.

Figure 1:
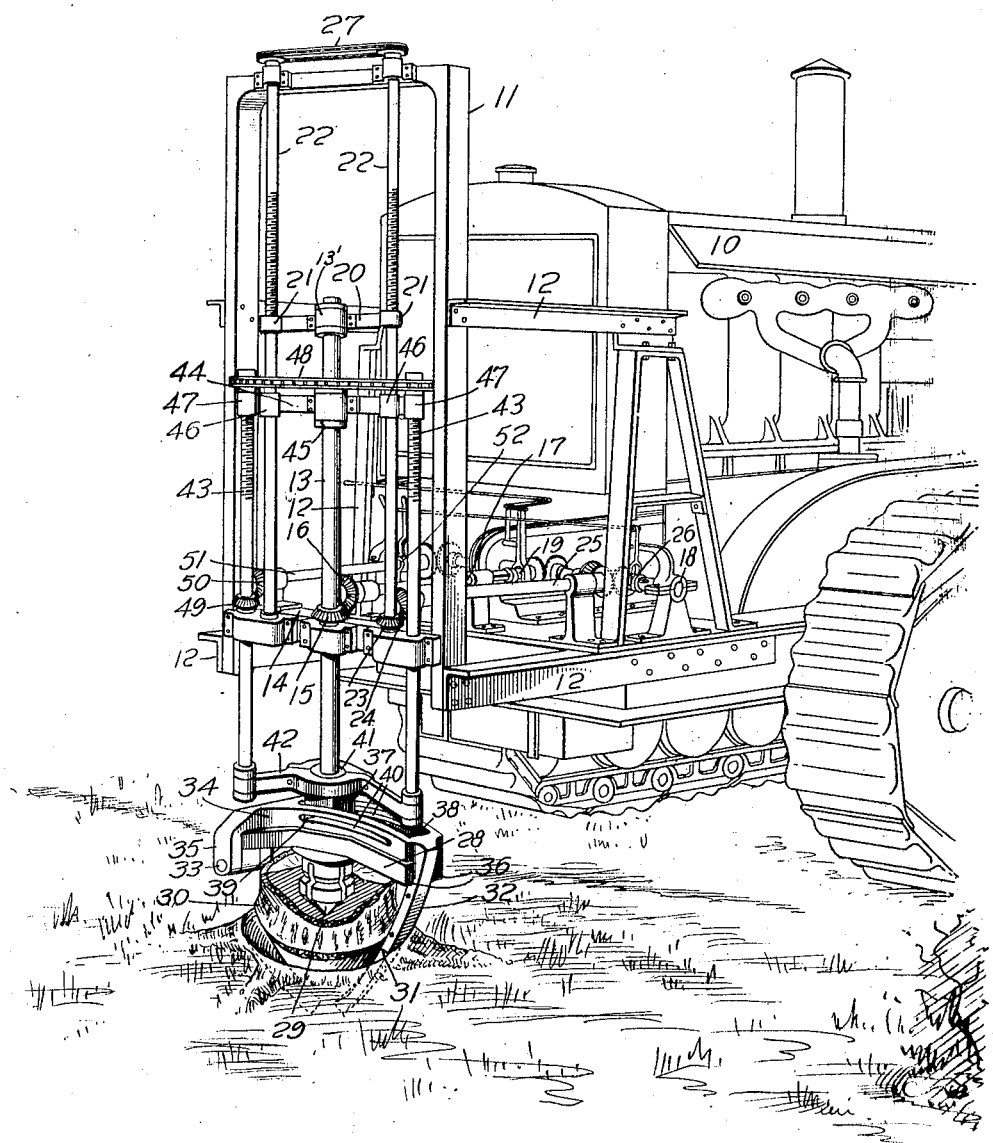
Figure 1 is a perspective view of a conventional dirigible power plant having a stump cutter mounted thereon.
Figure 1:

The improved stump cutter, which forms the subject matter of this invention, is adapted to be mounted upon any approved form of power plant, preferably portable, or dirigible, such a power plant being shown conventionally as a whole at 10 Figure 1.

The mechanism, embodying the present invention, comprises an upstanding frame 11 rigidly secured to the power plant in any manner, and by the use of any means found convenient or desirable, dependent upon the nature of the power plant, here shown as the structure and braces 12.

Mounted upon the frame 11 is a spindle 13 rotating upon a vertical axis and journaled in a bar 14 rigidly connected with the frame 11. The spindle 13 is mounted to slide longitudinally through its bearing in the bar 14 and through a gear 15 splined thereto which is inter-geared with a gear 16 carried by a shaft 17 and to receive power from a power shaft 18 by means of gears and a clutch, shown conventionally at 19. The upper end of the spindle 13 is journaled in a thrust bearing 13' in a cross-bar 20, the extremities of which are provided with threaded sleeves 21 engaging upon a pair of spaced, vertical worms 22.

The worms 22 are journaled in the frame 11 and one is provided with a gear 23 intergearing with a gear 24 upon shaft 25 which receives power from the power shaft 18 by means of a reversing mechanism, indicated as a conventional structure at 26, so that the gear 23 may be driven from the power shaft in either direction. The worms 22 are connected, by means of a sprocket chain 27 whereby such worms 22 are actuated in synchronism.

The lower extremity of spindle 13 is provided with a cross head 28 secured thereto in any approved manner, preferably by means of a centering bit 29 of any well-known type, adapted to bore into, and form a bearing in, the top of the stump 30. As, therefore, the spindle 13 is rotated from the drive, above described, and moved downwardly, by the actuation of worms 22 in the required direction, the centering bit will bore into the top of the stump. When a sufficient bearing in the stump has been provided, by such a combination of rotative and longitudinal movement, the feeding movement is stopped and the rotative movement continued.

To utilize the continued rotative movement, a cutter 31 is provided, telescoping within a knife arm 32, the cutter member 31 and arm 32 being arcuate in form with a pivot 33 as a center. To carry the knife arm 32 a lever 34 is provided, preferably though not necessarily, formed integral with the knife arm 32 and having downwardly extending ears 35 engaging the cross head 28 at the pivot 33. The knife arm 32 and cutter 31 being carried by the lever 34 with its pivot 33 as a center, it is obvious that as the structure is moved upon such pivot, cutter 31 will follow an arcuate path, and as the cutting structure is rotated with the cross head about the axis of spindle 13 the rotary path followed by the cutter 31 will be converted into a conoidal cut having the apex of the conoid directed downwardly and coinciding with the axis of spindle 13. The cross head 28 is provided with abutments 36 forming a guideway therebetween to embrace and prevent vibration of the cutter structure in operation.

To swing the lever upon the pivot 33 and thereby advance cutter 31, a block 37 is loosely mounted upon the spindle 13 slidable in a slot 38 in the lever 34. This block is provided with pins 39 extending diametrically from the surrounded spindle 13 slidable in slots 40 formed in the lever 34.

The block 37 carries a collar 41 rotatively mounted in a cross-head 42 carried at the lower extremity of shafts 43. The shafts 43 are slidably journaled in the cross bar 14 and travel axially with the spindle 13 by means of a cross-head 44 which is loosely mounted upon the spindle 13 and held from longitudinal movement relative thereto in any approved manner as by the collars 45. The cross-bar 44 is provided with sleeves 46 slidably engaging the worms 22 and other threaded sleeves 47 engaging threads formed upon the shafts 43. The shafts 43 are arranged to be rotated simultaneously by a sprocket chain 48 and are driven by means of the gear 49 splined upon one of the said shafts which is intergeared with a gear 50 carried upon a shaft 51 which in turn receives power from the power shaft 18 by means including a reversing clutch shown conventionally at 52.

As the threaded shafts 43 move with the spindle 13 it is obvious that any rotation of such shafts 43 in either direction will move crosshead 42 and the block 37 relative to such spindle whereby the lever 34 is moved about its pivot 33 relative to the cross head 28. If the shafts 43 are rotated in one direction the lever 34 and the knife arm 32 will therefore be moved to the dotted position as shown in Figure 2, the cross-head also moving to such dotted position.

At times, when for instance the device is used primarily for the clearing of land for agricultural or other purposes when it is especially desirable that as great a portion of the stump be removed as possible and that therefore as great a portion of the cut be made below the surface of the ground as possible, it is obvious that a tall stump cannot be properly operated upon by reason of the fixed relations between the centering bit 29 and the path of cut of the cutter 31. At such times it is desirable to reduce the height of the stump, before actuating the cutter 31. For this purpose the cutter head 28 is provided with knives 53 and 54. To utilize such knives 53 and 54 the device is lowered into operative engagement with the tall stump and rotated until the centering bit 29 has entered the same to such a distance that the knives 53 and 54 are brought into cutting engagement with the top of the stump, the rotative movement being continued until the knives cut a sufficient amount from the top of the stump to reduce it to the required height. At this point, advancing the cutter head is stopped and cutter 31 brought into action. At times, and under some conditions, the length of the cutter member 31 alone is not sufficient to produce a conoidal cut necessary to sever the stump from its roots and at such times the knife arm 32 may move to such position as to encounter the stump or some of the roots. For the purpose of cutting a path, to prevent the breakage of such arm in case of such encounter, a knife 55 is mounted upon the lower extremity of the knife arm 32 in such a position as to cut its own path, should its path not accurately coincide with the path cut by the cutter 31.

In operation, the power plant, carrying the cutting mechanism, is moved from stump to stump and actuated until the centering bit is located with reasonable accuracy over the center of the stump to be cut. The movement of the vehicle is then stopped and the cutter head lowered, by driving worms 22 and simultaneously rotated, by driving spindle 13. When the centering bit has bored into the stump a sufficient distance to form a bearing, to prevent vibration, the advancing of the cutter head is stopped, rotary motion continued and the cutter 31 brought into action by operating threaded shafts 43. When the conoidal cut has been extended to a complete severing of the stump, or to such near approach to complete severing as will permit the stump to be manually removed from its retaining roots, the cutter 31 is withdrawn by imparting a reverse motion to shafts 43, such withdrawal being either while the rotary motion is continued or after rotary motion has stopped. The cutter 31 having been withdrawn from the channel which it has cut in the stump, the centering bit 29 is removed by moving spindle 13 upwardly and the entire structure thereby disengaged from the stump and conditioned to be moved to the next stump, whereupon the operation is repeated.

We claim:

1. The combination with a power plant, of a spindle journaled to rotate upon a vertical axis and to be moved longitudinally, simultaneously and independently from the power plant, a head carried at the lower extremity of the spindle, a lever fulcrumed upon the head upon one side of the spindle and extended to the opposite side, an arcuate cutting member carried by the lever with the fulcrum as its center of curvature, a sleeve slidable upon the spindle and controlling the movement of the lever on its fulcrum, and means actuated from the power plant for moving the sleeve.

2. The combination with a crosshead of means to rotate the head as a diameter, a centering bit at the advance side of the crosshead axially coinciding with the axis of rotation, a lever pivoted to one end of the crosshead and extending across as a diameter at the rearward side of the crosshead, an arm carried by the lever at the end opposite the pivot and extending in advance of the crosshead upon an arc with the pivot as a center, a cutter carried by the arm, and means to oscillate the lever relative to the crosshead to advance the cutter progressively further in advance of the crosshead.

3. The combination with a crosshead of means to rotate the head as a diameter, a centering bit at the advance side of the crosshead axially coinciding with the axis of rotation, a lever pivoted to one end of the crosshead and extending across as a diameter at the rearward side of the crosshead, an arm carried by the lever at the end opposite the pivot and extending in advance of the crosshead upon an arc with the pivot as a center, a cutter carried by the arm, and means to oscillate the lever relative to the crosshead to advance the cutter progressively further in advance of the crosshead and nearer to the center of rotation.

4. The combination with a crosshead of means to rotate the head as a diameter, a centering bit at the advance side of the crosshead axially coinciding with the axis of rotation, a lever pivoted to one end of the crosshead and extending across as a diameter at the rearward side of the crosshead, an arm carried by the lever at the end opposite the pivot and extending in advance of the crosshead upon an arc with the pivot as a center, a cutter carried by the arm, and means to oscillate the lever relative to the crosshead to advance the cutter progressively further in advance of the crosshead, the arm being proportioned to follow into the cut made by the cutter.

5. The combination with a crosshead of means to rotate the head as a diameter, a centering bit at the advance side of the crosshead axially coinciding with the axis of rotation, a lever pivoted to one end of the crosshead and extending across as a diameter at the rearward side of the crosshead, an arm carried by the lever at the end opposite the pivot and extending in advance of the crosshead upon an arc with the pivot as a center, a cutter carried by the arm, and means to oscillate the lever relative to the crosshead to advance the cutter progressively further in advance of the crosshead, and nearer to the center of rotation, the arm being proportioned to follow into the cut made by the cutter.

6. A cutter head comprising a rotating part, a lever pivoted at one side of and extending across the axis of rotation, a cutter arm carried by the lever at its end opposite its pivot and curved toward the axis, and a cutter carried at the end of the arm.

7. A cutter head comprising a rotating part, a lever pivoted at one side of and extending diametrically across the axis of rotation, a cutter arm carried by the lever at its end opposite its pivot and curved toward the axis with the pivot as the center of curvature, and a cutter carried at the end of the arm, the curvature of the arm being such that it follows into the cut produced by the cutter as said cutting organization gyrates and swings upon its pivot.

8. A cutter head comprising a rotating part, a lever pivoted at one side of and extending diametrically across the axis of rotation, a cutter arm carried by the lever at its end opposite its pivot and curved toward the axis with the pivot as the center of curvature, a cutter carried by the arm, and means to swing the lever upon its pivot, the curvature of the arm being such that it follows into the cut produced by the cutter as said cutting organization gyrates and swings upon its pivot.

9. A cutter head comprising a rotating part, a cutter arm carried by one side of the axis and curved as an arc with its center upon the opposite side, a cutter carried at the extremity of the arm, and means to oscillate the arm upon its curvature, said arm being proportioned to follow into the cut produced by the cutter.

10. A cutter head comprising a rotating part, a lever pivoted upon one side of and extending across the axis of rotation, a cutter arm carried by the lever and positioned to gyrate about the exterior of the body to be cut, and means to swing the lever and arm upon said pivot to move the cutting element from said exterior position progressively inwardly toward the axis of rotation.

In testimony whereof we affix our signatures.

EDWIN A. McKOY.
GEORGE D. MOORE.